United States Patent
Iwamura et al.

(12) 
(10) Patent No.: US 10,406,861 B2
(45) Date of Patent: Sep. 10, 2019

(54) AIRLESS TIRE

(71) Applicant: SUMITOMO RUBBER INDUSTRIES, LTD., Kobe-shi (JP)

(72) Inventors: Wako Iwamura, Kobe (JP); Makoto Sugiya, Kobe (JP)

(73) Assignee: SUMITOMO RUBBER INDUSTRIES, LTD., Kobe-shi (JP)

(*) Notice: Subject to any disclaimer, the term of this patent is extended or adjusted under 35 U.S.C. 154(b) by 292 days.

(21) Appl. No.: 15/331,529

(22) Filed: Oct. 21, 2016

(65) Prior Publication Data

US 2017/0113490 A1    Apr. 27, 2017

(30) Foreign Application Priority Data

Oct. 22, 2015  (JP) ................. 2015-208349

(51) Int. Cl.
| | | |
|---|---|---|
| B60C 7/14 | (2006.01) | |
| B60C 7/18 | (2006.01) | |
| B60C 7/00 | (2006.01) | |

(52) U.S. Cl.
CPC ............... *B60C 7/18* (2013.01); *B60C 7/143* (2013.01); *B60C 2007/146* (2013.01)

(58) Field of Classification Search
CPC .. B60C 7/00; B60C 7/14; B60C 7/143; B60C 7/16; B60C 2007/146
See application file for complete search history.

(56) References Cited

U.S. PATENT DOCUMENTS

| | | |
|---|---|---|
| 2014/0191564 A1 | 7/2014 | Gebeau |
| 2014/0191565 A1 | 7/2014 | Gebeau |
| 2014/0332127 A1 | 11/2014 | Iwamura |

FOREIGN PATENT DOCUMENTS

| | | | |
|---|---|---|---|
| CN | 204586332 U | | 8/2015 |
| DE | 29608451 | * | 10/1996 |
| EP | 2 801 485 A1 | | 11/2014 |
| JP | 1-314602 A | | 12/1989 |
| JP | 3-189202 A | | 8/1991 |
| JP | 4852767 B | | 11/2011 |
| JP | 4855646 B | | 11/2011 |
| JP | 4914211 B | | 1/2012 |
| JP | 5539479 B | | 5/2014 |

(Continued)

OTHER PUBLICATIONS

Extended European Search Report dated Feb. 24, 2017 in Patent Application No. 16194565.4

*Primary Examiner* — Justin R Fischer
(74) *Attorney, Agent, or Firm* — Oblon, McClelland, Maier & Neustadt, L.L.P.

(57) ABSTRACT

An airless tire includes a tread ring including an elastic body and having a cylindrical form and a ground contact surface, a hub including a substantially non-extensible material and positioned on a tire radial direction inner side of the tread ring such that the hub is fixed to an axle, and multiple spokes including an elastic material and connecting the tread ring and the hub. Each of the spokes has an outer edge fixed to the tread ring and an inner edge fixed to the hub such that the outer edge and the inner edge are extending obliquely with respect to a tire axial direction, and the spokes are formed such that the outer edge of each of the spokes has compression rigidity $S_r$ which is greater than compression rigidity $S_h$ of the inner edge of each of the spokes.

20 Claims, 8 Drawing Sheets

(56) References Cited

FOREIGN PATENT DOCUMENTS

| KR | 2012070469 | * | 6/2012 |
|----|------------|---|--------|
| WO | WO 2007/057975 A1 | | 5/2007 |
| WO | WO 2015/098656 A1 | | 7/2015 |

* cited by examiner

AIRLESS TIRE

CROSS-REFERENCE TO RELATED APPLICATIONS

The present application is based upon and claims the benefit of priority to Japanese Patent Application No. 2015-208349, filed Oct. 22, 2015, the entire contents of which are incorporated herein by reference.

BACKGROUND OF THE INVENTION

Field of the Invention

The present invention relates to an airless tire capable of supporting a load by its own structure without using high-pressure air.

Description of Background Art

In recent years, various airless tires have been proposed, for example, in Japanese Patent No. 4852767, Japanese Patent No. 4914211, Japanese Patent No. 4855646, and Japanese Patent No. 5539479. An airless tire can support a load by its own structure without using high-pressure air. Therefore, the airless tire has an advantage that it does not go flat. The entire contents of these publications are incorporated herein by reference.

SUMMARY OF THE INVENTION

According to one aspect of the present invention, an airless tire includes a tread ring including an elastic body and having a cylindrical form and a ground contact surface, a hub including a substantially non-extensible material and positioned on a tire radial direction inner side of the tread ring such that the hub is fixed to an axle, and multiple spokes including an elastic material and connecting the tread ring and the hub. Each of the spokes has an outer edge fixed to the tread ring and an inner edge fixed to the hub such that the outer edge and the inner edge are extending obliquely with respect to a tire axial direction, and the spokes are formed such that the outer edge of each of the spokes has compression rigidity Sr which is greater than compression rigidity Sh of the inner edge of each of the spokes.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

The embodiments will now be described with reference to the accompanying drawings, wherein like reference numerals designate corresponding or identical elements throughout the various drawings.

Figure 1:
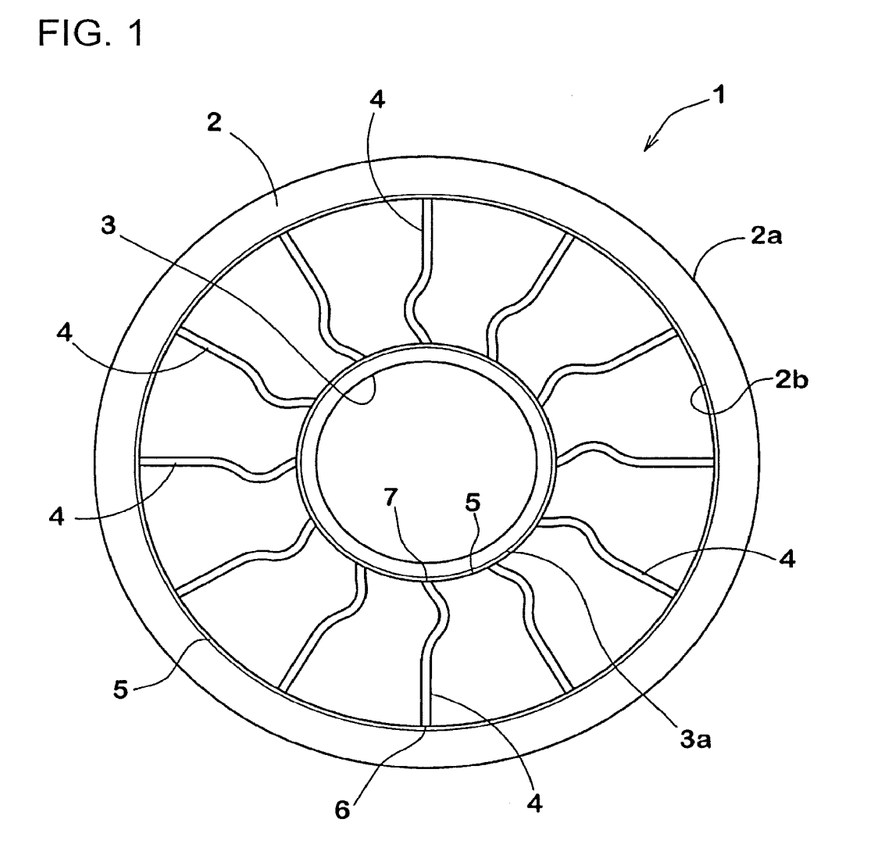
FIG. 1 is an overall side view of an airless tire according to an embodiment of the present invention.
Figure 2:
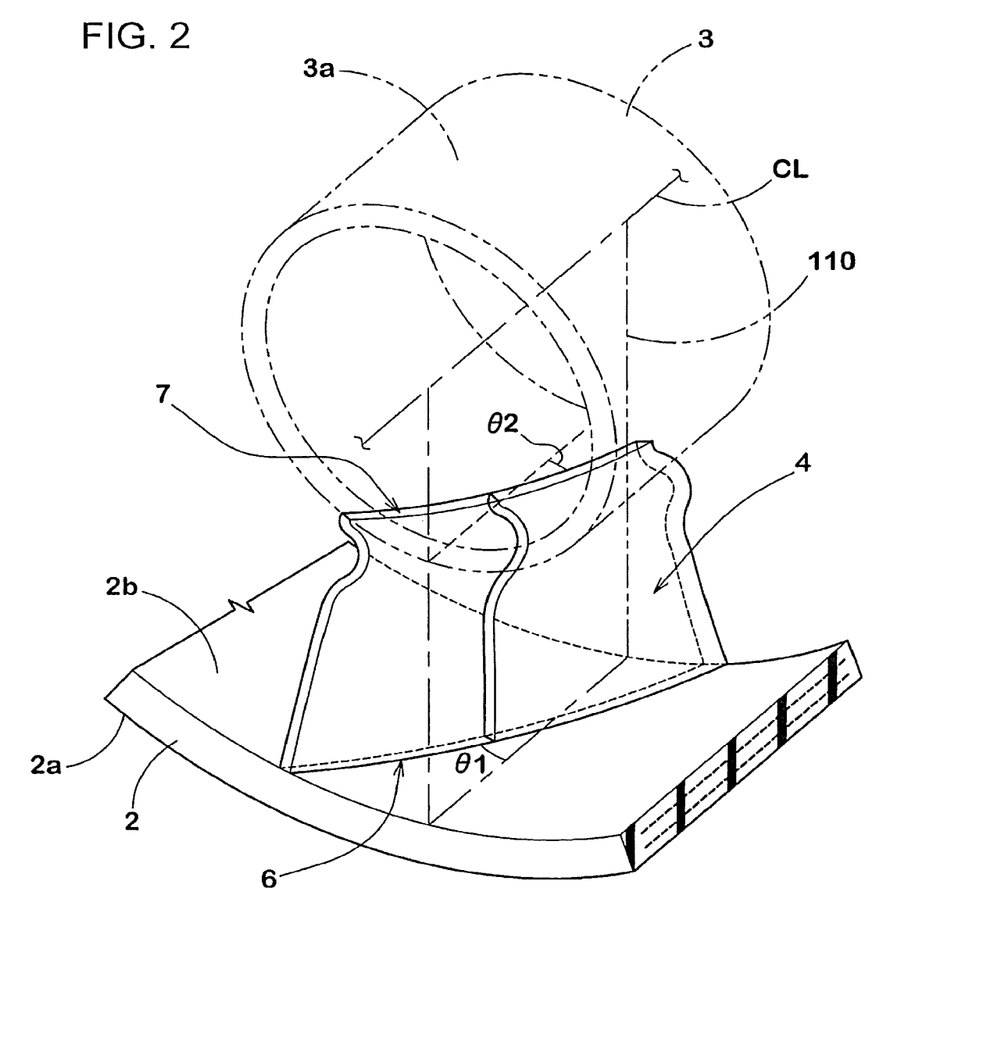
FIG. 2 is a partial perspective view of the airless tire of FIG. 1.

FIG. 1 is illustrates overall side view of an airless tire 1 of the present embodiment. FIG. 2 illustrates a partial perspective view of the airless tire 1. As illustrated in FIGS. 1 and 2, the airless tire 1 of the present embodiment includes a cylindrical tread ring 2 formed of an elastic body, a hub part 3 that is positioned on a tire radial direction inner side of the tread ring 2, and multiple spokes 4 that are formed of an elastic material and are for connecting the tread ring 2 and the hub part 3. In the present embodiment, for example, an airless tire designed for a passenger car is illustrated. However, an embodiment of the present invention is applicable as a tire for any vehicle.

The tread ring 2 is a continuous annular body and has a ground contact surface (2a) and an inner peripheral surface (2b), the ground contact surface (2a) being in contact with a road surface, and the inner peripheral surface (2b) being on an opposite side of the ground contact surface (2a). The tread ring 2, for example, is formed of a rubber excellent in wear resistance and contains a cord reinforcing layer in the rubber. For details of these, varies embodiments can be adopted according to common practice. As can be understood from the side view of FIG. 1, the ground contact surface (2a) and the inner peripheral surface (2b) are each formed as a cylindrical surface. Various patterns, such as grooves, recesses, and even through holes, can be provided on the ground contact surface (2a) for discharging water of the road surface to outside of the tire.

The hub part 3 corresponds to a so-called wheel rim to be mounted on a pneumatic tire and is fixed on an axle (not illustrated in the drawings). The hub part 3, for example, is formed of a substantially inextensible material such as steel, an aluminum alloy or a magnesium alloy.

As illustrated in FIG. 1, the multiple spokes 4 are provided along a tire circumferential direction. As can be understood from FIG. 2, the spokes 4 each have a plate-like shape. In FIG. 2, a transverse cross section of a spoke 4 along the tire radial direction is illustrated as being lightly colored. In the present embodiment, the spokes 4 are formed from a cast-molded body of a thermosetting resin, more specifically, a polyurethane resin. For example, the tread ring 2 and the hub part 3 are positioned in advance in a mold, and the thermosetting resin is filled in the mold so as to connect the tread ring 2 and the hub part 3. By curing the polymer material by heating, the spokes 4 that connect the tread ring 2 and the hub part 3 are molded.

As illustrated in FIG. 1, in the present embodiment, a bonding layer 5 annularly continuously extending in the tire circumferential direction is provided on each of the inner peripheral surface (2b) of the tread ring 2 and an outer peripheral surface (3a) of the hub part 3. The bonding layers 5 of the present embodiment, for example, are formed of the substantially same material as the spokes 4. Such bonding layers 5 allow an outer edge 6 and an inner edge 7 of each of the spokes 4 to be respectively more firmly connected to the tread ring 2 and the hub part 3. The bonding layers 5 of the present embodiment are each formed to have a thickness of, for example, about 1-3 mm.

The spokes 4 each have the outer edge 6 that is fixed to the tread ring 2 side and the inner edge 7 that is fixed to the hub part 3 side.

As in the present embodiment, when the spokes 4 are fixed to the tread ring 2 via the bonding layer 5 (illustrated in FIG. 1), the outer edge 6 of each of the spokes 4 is defined as an end part (end surface) excluding the bonding layer 5. Similarly, the inner edge 7 of each of the spokes 4 is defined as an end part (end surface) excluding the bonding layer 5.

As in the present embodiment, when the spokes 4 and the bonding layers 5 are integrally connected, the outer edges 6 and the inner edges 7 of the spokes 4 can be determined by imaginarily and smoothly connecting surfaces of portions of the bonding layers 5 where the spokes 4 are not provided.

As is clear from FIG. 2, both the outer edge 6 and the inner edge 7 of each of the spokes 4 extend obliquely with respect to a tire axial direction from one end side to the other end side in a tire width direction. The outer edge 6 of each of the spokes 4 is inclined at an angle ($\theta 1$) with respect to a tire radial plane 110 that contains a tire rotation axis (CL). Similarly, the inner edge 7 of each of the spokes 4 is inclined at an angle ($\theta 2$) in the same orientation as the outer edge 6 with respect to the tire radial plane 110 that contains the tire rotation axis (CL). Such inclined spokes 4 relax variation in rigidity of the tread ring 2 in the tire circumferential direction, suppress vibration of the tire during running, and help to provide excellent riding comfort.

In order to sufficiently improve the riding comfort while maintaining lateral rigidity of the airless tire 1, it is desirable that each of the angles ($\theta 1$, $\theta 2$) of the spokes 4 be preferably about 10-70 degrees. In the present embodiment, the angle ($\theta 1$) is substantially the same as the angle ($\theta 2$). However, the present invention is not limited to such an embodiment.

Further, when a position pitch of the spokes 4 in the tire circumferential direction, for example, is equal to or less than a tire circumferential direction length of each of the spokes 4, the spokes 4 can be continuously in contact with a road surface via the tread ring 2 without interruption. Such an airless tire 1 can provide more excellent riding comfort.

Since the spokes 4 are obliquely positioned with respect to the tire radial plane 110 and the inner peripheral surface (2b) of the tread ring 2 is a cylindrical surface, the outer edge 6 of the each of the spokes 4 is formed to have a surface of an arc shape that is convex toward a tire radial direction outer side. On the other hand, since the spokes 4 are obliquely positioned with respect to the tire radial plane 110 and the outer peripheral surface (3a) of the hub part 3 is a cylindrical surface, the inner edge 7 of the each of the spokes 4 is formed to have a surface of a concave arc shape.

In the present embodiment, compression rigidity (Sr) of the outer edge 6 side of each of the spokes 4 is set to be greater than compression rigidity (Sh) of the inner edge 7 side of each of the spokes 4. As described in the Technical Background section, bending occurs in a spoke 4 due to deflection in the spoke 4. However, on the outer edge 6 side of the spoke 4, the deformation in which the outer edge 6 of an arc-shaped surface deforms to have a linear shape is further added. On the other hand, deformation of the inner edge 7 side of a spoke 4 (on the hub part 3 side) is basically only deformation due to the above-described deflection amount. Therefore, there is a tendency that distortion occurring in the spokes 4 is greater on the outer edge 6 side than on the inner edge 7 side. On the other hand, in order to improve durability of the spokes, it is important that distortion is dispersed as much as possible so that a locally large distortion does not occur in the spokes 4.

The airless tire 1 of the present embodiment is structured such that, as described above, the compression rigidity (Sr) of the outer edge 6 side of each of the spokes 4 is greater than the compression rigidity (Sh) of the inner edge 7 side of each of the spokes 4. During running of the tire, when the outer edge 6 side of a spoke 4 comes into contact with a road surface and deflects to become flat, by increasing distortion occurring on the inner edge 7 side of the spoke 4 as compared to the conventional case, deflection on the outer edge 6 side of the spoke 4 can be relatively reduced. As a result, distortion acting on each of the spokes 4 during running of the tire is dispersed or uniformized and thus the durability of the spokes 4 is improved. That is, the airless tire 1 of the present embodiment can significantly improve the durability while maintaining excellent riding comfort due to the oblique spokes 4.

Figure 3:
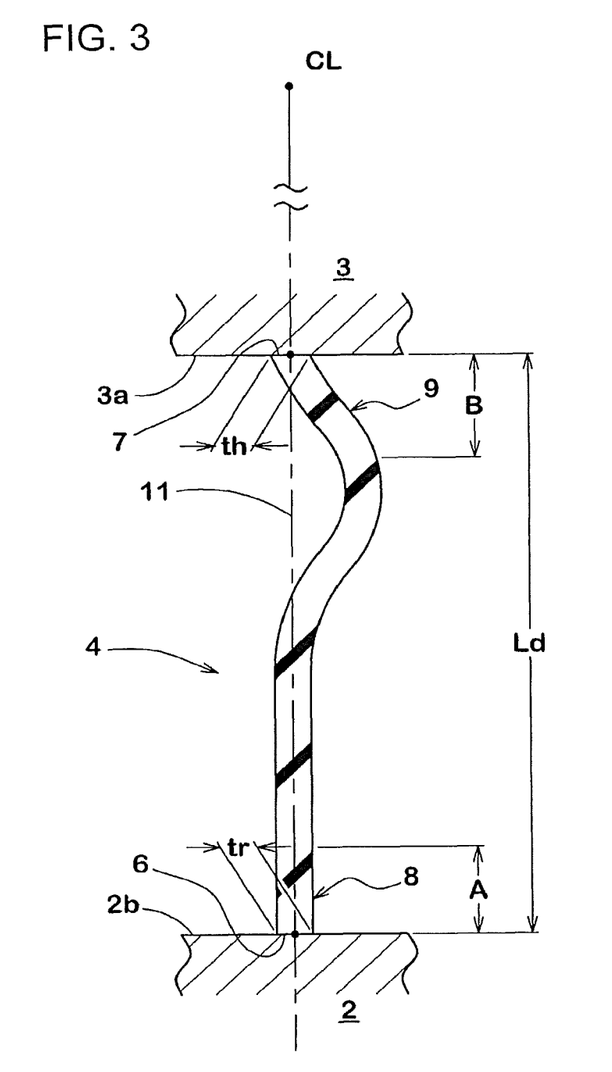
FIG. 3 is a cross-sectional view of a spoke.

FIG. 3 illustrates a transverse section (the lightly colored portion in FIG. 2) of the spoke 4 illustrated in FIG. 2 along the tire radial direction. In the present embodiment, the outer edge 6 and the inner edge 7 of each of the spokes 4 are provided on the same radial line 11 that passes through the tire rotation axis (CL). Such spokes 4 also are effective in suppressing vibration during running of the tire, and in particular, are effective in improving tangential force variation (TFV) and lateral force variation (LFV).

The compression rigidity (Sr) of the outer edge 6 side of each of the spokes 4, when the airless tire 1 is in the no-load state, is defined as compression rigidity of an outer edge side portion 8 of each of the spokes 4 between the outer edge 6 and a position a distance (A) away from the outer edge 6 on a tire radial direction inner side. Similarly, the compression rigidity (Sh) of the inner edge 7 side of a spoke 4 is defined as compression rigidity of an inner edge side portion 9 of the spoke 4 between the inner edge 7 and a position a distance (B) away from the inner edge 7 on a radial direction outer side. The distance (A) and the distance (B) are each 20% of a radial direction length of the spoke 4 (in this example, corresponding to a shortest distance (Ld) of the spoke of FIG. 3). This is because contribution of this portion to the rigidity of an edge side of a spoke is particularly large.

Figure 4A:
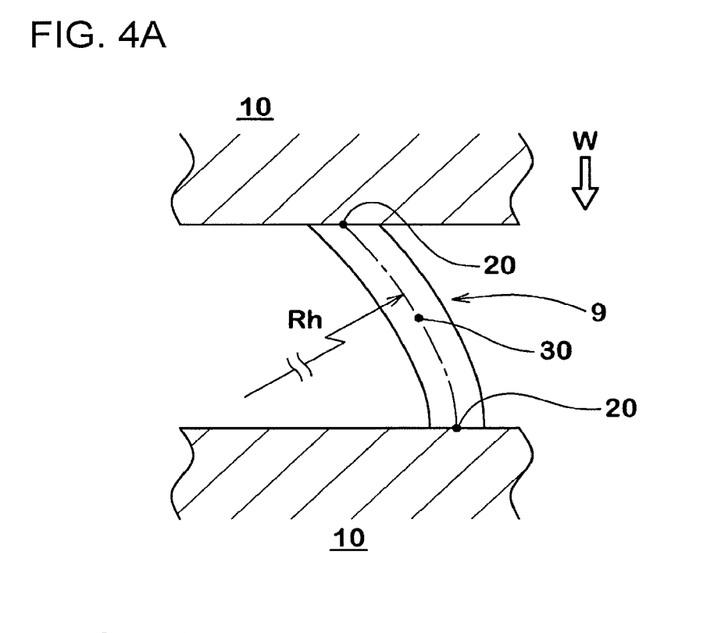
FIG. 4A is a cross-sectional view for describing compression rigidity of an outer edge side of a spoke.
Figure 4B:
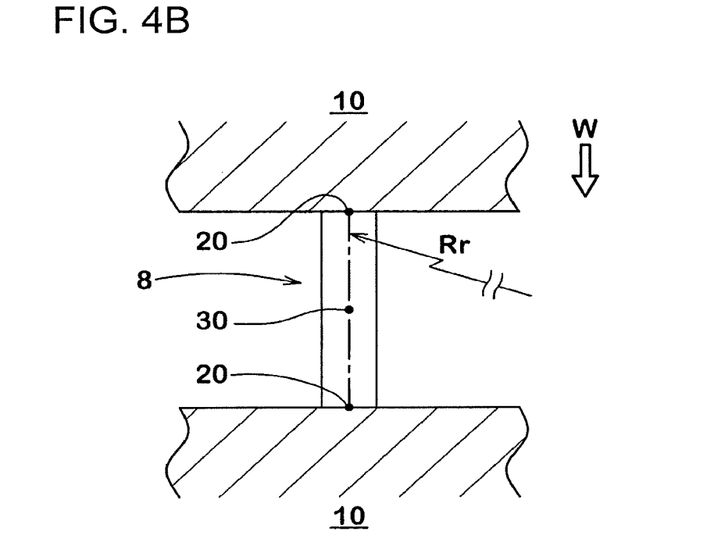
FIG. 4B is a cross-sectional view for describing compression rigidity of an inner edge side of a spoke.

The compression rigidity of the outer edge side portion 8 and the compression rigidity of the inner edge side portion 9 are each measured as follows. First, as illustrated in FIGS. 4A and 4B, the outer edge side portion 8 and the inner edge side portion 9 are cut out from a spoke 4. Two ends of each of the outer edge side portion 8 and the inner edge side portion 9 are respectively fixed to jigs 10, 10 while maintaining a shape of each of the outer edge side portion 8 and the inner edge side portion 9 when the spoke is used (a shape in a no-load state). Next, a load (W) in a direction along the radial line 11 of FIG. 3 is applied to the 10, and a deflection amount ($\delta$) of each of the portions 8, 9 along the radial line 11 is measured. Then, based on a ratio (W/$\delta$) of the load (W) to the deflection amount ($\delta$), the compression rigidity of each of the outer edge side portion 8 and the inner edge side portion 9 is obtained.

A ratio (Sh/Sr) between the compression rigidities of the spokes 4 is not particularly limited, but is preferably 0.95 or less, and more preferably 0.90 or less. This is preferable in that it allows distortion acting on the spokes 4 during running of the tire to be more effectively dispersed to the inner edge 7 side. A lower limit of the ratio (Sh/Sr) between the compression rigidities is also not particularly limited. However, when the ratio (Sh/Sr) is too small, there is a risk that the distortion acting on the spokes 4 during running of the tire is concentrated on the inner edge 7 side. Therefore, it is desirable that the ratio (Sh/Sr) be preferably 0.05 or more, and more preferably 0.10 or more, and even more preferably 0.20 or more.

As measure for adjusting the compression rigidity (Sr) of the outer edge 6 side and the compression rigidity (Sh) of the inner edge 7 side of each of the spokes 4, various modes can be adopted.

In the embodiment of FIG. 3, as an example, a mode is illustrated in which the outer edge side portion 8 of the spoke 4 is positioned along the radial direction, while the inner edge side portion 9 of the spoke 4 is positioned to be more significantly inclined with respect to the radial direction. As a result, when a compressive load acts on the spokes 4, the outer edge side portion 8 is less likely to be deflected, while the inner edge side portion 9 is structured to be easily deflected. In the embodiment illustrated in FIG. 3, as an overall shape, the spoke 4 extends substantially straightly from the outer edge 6 along the radial direction and thereafter extends in a curved manner to reach the inner edge 7 so as to form a smooth curved shape that is convex toward one side in the tire circumferential direction.

As illustrated in FIG. 3, it is desirable that each of the spokes 4 be formed such that an actual length (Ls) from the outer edge 6 to the inner edge 7 (length measured along the shape) greater than the shortest distance (Ld) from the outer edge 6 to the inner edge 7. As a result, for example, during rotation of the tire, an elongation margin can be provided to a spoke 4 positioned directly above the hub part 3 for supporting a load. In order to reliably achieve such an effect, it is desirable that the actual length (Ls) of each of the spokes 4 be 1.01 or more times the shortest distance (Ld). On the other hand, when the actual length (Ls) of each of the spokes 4 is too large, there is a risk that, during rotation of the tire, a spokes 4 positioned directly above the hub part 3 cannot support a load. From this point of view, it is desirable that the actual length (Ls) of each of the spokes 4 be 1.10 times or less than the shortest distance (Ld).

In the present embodiment, a thickness (tr) of the outer edge 6 side of each of the spokes 4 is set to be substantially equal to a thickness (th) of the inner edge 7 side of each of the spokes 4 (0.8≤tr/th≤1.2). However, as another measure for adjusting the compression rigidity (Sr) of the outer edge 6 side and the compression rigidity (Sh) of the inner edge 7 side of each of the spokes 4, the thickness (tr) of the outer edge 6 side of each of the spokes 4 may be set to be greater than the thickness (th) of the inner edge 7 side of each of the spokes 4.

The measure for adjusting the rigidities by varying the thicknesses of the spokes 4 may be used in combination with the above-described mode or may be adopted separately and independently. Such a mode also allows the compression rigidity (Sr) of the outer edge 6 side of each of the spokes 4 to be set to be greater than the compression rigidity (Sh) of the inner edge 7 side of each of the spokes 4. The above-described thicknesses (tr, th), as illustrated in FIG. 4A and 4B, are respectively defined as average thicknesses of the portions (8, 9) that are cut out from a spoke 4. When a chamfer or the like is provided at a boundary with the tread ring 2 or the hub part 3, the thicknesses (tr, th) are defined as thicknesses with the chamfer or the like excluded.

On the other hand, when the compression rigidities are adjusted by varying the thicknesses of the spokes 4, there is a risk that, depending on the set thicknesses, deterioration in durability may occur on the inner edge 7 side having a small thickness (th). Therefore, as a preferred mode, it is desirable that the thickness (tr) of the outer edge 6 side of each of the spokes 4 be 1.2 or less times the thickness (th) of the inner edge 7 side of each of the spokes 4.

As yet another measure for adjusting the compression rigidity (Sr) of the outer edge 6 side and the compression rigidity (Sh) of the inner edge 7 side of each of the spokes 4, as illustrated in FIG. 4A and 4B, in the transverse cross section of each of the spokes 4 along the tire radial direction, a curvature radius (Rh) of the inner edge 7 side (the inner edge side portion 9) of each of the spokes 4 is set to be smaller than a curvature radius (Rr) of the outer edge 6 side (the outer edge side portion 8) of each of the spokes 4. This measure may be used in combination with the above-described modes or may be adopted separately and independently.

When the curvature radius of a portion is large, the compression rigidity of the portion is increased. On the other hand, when the curvature radius of a portion is small, deflection easily occurs with the portion as a starting point. In FIGS. 4A and 4B, the curvature radius (Rr) of the outer edge side portion 8 is substantially infinitely large. The inner edge side portion 9 has a curvature that is convex toward one side only and the curvature radius (Rh) of the inner edge side portion 9 is set to be smaller than the curvature radius (Rr). In the outer edge side portion 8 or the inner edge side portion 9, when the curvature radius continuously varies, the curvature radius (Rr) or the curvature radius (Rh) is identified by a single arc passing through three points including two ends (20, 20) of the portion and a middle portion 30 between the two ends (20, 20).

Figure 5:
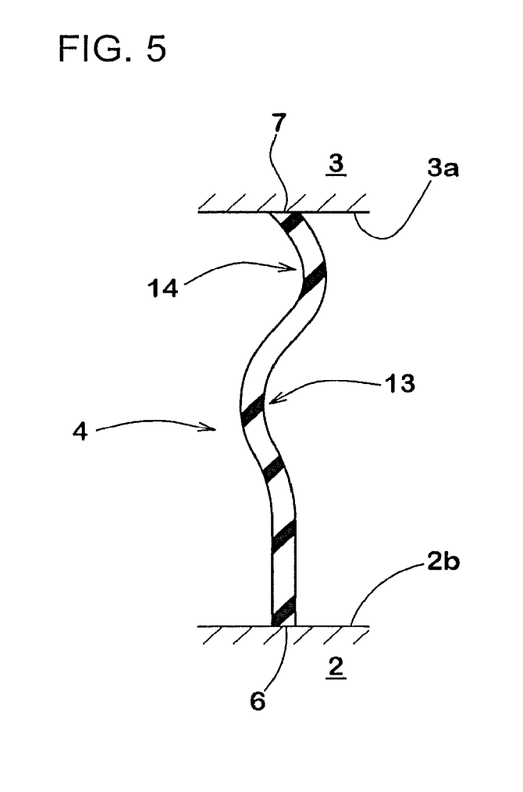
FIG. 5 is a cross-sectional view illustrating another embodiment of a spoke.

FIG. 5 illustrates a transverse cross section of a spoke 4 of another embodiment along the tire radial direction. In the embodiment illustrated in FIG. 5, as an overall shape, the spoke 4 extends substantially straightly from the outer edge 6 along the radial direction and thereafter extends to reach the inner edge 7 in a manner forming a smooth first curved portion 13 and a smooth second curved portion 14, the first curved portion 13 being convex toward one side in the tire circumferential direction, and the second curved portion 14 being convex toward the other side in the tire circumferential direction. In the spoke 4 of such an embodiment, the compression rigidity (Sr) of the outer edge 6 side is set to be greater than the compression rigidity (Sh) of the inner edge 7 side.

Although not illustrated in detail in the drawings, for example, in the transverse cross sectional shape of the spoke of FIG. 5, an S-shaped transverse cross sectional shape excluding the portion that extends linearly in the radial direction may also be adopted. In this case, the compression rigidities can be adjusted by varying the curvature radii or thicknesses of the two curved portions (13, 14).

In the above, an embodiment of the present invention is described in detail. However, the present invention is not limited to the illustrated embodiment and can be embodied in various modified modes. In particular, regarding a specific shape of each of the spokes 4, an embodiment of the present invention includes any mode in which the compression rigidity (Sr) of the outer edge 6 side of each of the spokes 4 is greater than the compression rigidity (Sh) of the inner edge 7 of each of the spokes 4, which is the gist of the present invention.

EXAMPLES

Airless tires (tires corresponding to a tire size of 125/80R13) that each form the basic structure of FIG. 1-4 are prototyped, and durability, tire weight and TFV are tested. All the tires are structured according to substantially the same specifications except for the spokes. The spokes are integrally molded with the tread ring and the hub part via the bonding layers using a cast molding method using a urethane resin (thermosetting resin). Main common specifications are as follows.

Shortest Distance (Ld) of Spoke: 80 mm
Thickness (th) of Inner Edge Side of Spoke: 3 mm
Angles ($\theta 1$, $\theta 2$) of Spoke: 20 degrees A test method is as follows.

Durability

In conformity with FMVSS109, each of the test tires is run under a load of 1.5 kN on a drum test machine, and a running time until a failure occurred in the tire is measured. The result is an index number with a running time of Comparative Example 1 as 100. A greater index number indicates a better durability.

Tire Weight

A weight per one airless tire is measured. The result is an index number with a weight of Comparative Example 1 as 100. A smaller index number indicates a better weight.

TFV

A uniformity tester is used, and a tangential force variation (TFV) is measured under the following conditions. The result is an index number with a TFV of Comparative Example 2 as 100. A smaller index number indicates a better TFV.

The test results are illustrated in Table 1. In Table 1, in Example 1-3, a length ratio of the spokes is adjusted such that the compression rigidity ratio (Sh/Sr) of the spokes is not changed. Further, in Example 4-7, the compression rigidity ratio (Sh/Sr) of the spokes is changed by changing inclination of the inner edge side and outer edge side of each of the spokes.

TABLE 1

|  | Comparative Example 1 | Comparative Example 2 | Example 1 | Example 2 | Example 3 | Example 4 | Example 5 | Example 6 | Example 7 |
| --- | --- | --- | --- | --- | --- | --- | --- | --- | --- |
| Angles ($\theta 1$, $\theta 2$) (degrees) of spoke | 90 | 20 | 20 | 20 | 20 | 20 | 20 | 20 | 20 |
| Compression rigidity ratio (Sh/Sr) of spoke | 1.00 | 1.00 | 0.90 | 0.90 | 0.90 | 0.95 | 0.80 | 0.70 | 0.20 |
| Length ratio (Ls/Ld) of spoke | 1.02 | 1.02 | 1.01 | 1.10 | 1.02 | 1.02 | 1.02 | 1.02 | 1.05 |
| Thickness ratio (Tr/Th) of spoke | 1 | 1 | 1 | 1 | 1 | 1 | 1 | 1 | 1 |
| Curvature radius ratio (Rh/Rr) of spoke | 1.00 | 1.00 | 0.80 | 0.80 | 0.80 | 0.89 | 0.80 | 0.50 | 0.50 |
| Is spoke on radial line? (*) | Y | Y | Y | Y | Y | Y | Y | Y | Y |
| Durability (index number) | 100 | 80 | 120 | 100 | 140 | 120 | 150 | 160 | 170 |
| Tire weight (index number) | 100 | 100 | 100 | 100 | 100 | 100 | 100 | 100 | 100 |
| TFV (index number) | 30 | 100 | 100 | 100 | 100 | 100 | 100 | 100 | 100 |

|  | Example 8 | Example 9 | Example 10 | Example 11 | Example 12 | Example 13 | Example 14 | Example 15 |
| --- | --- | --- | --- | --- | --- | --- | --- | --- |
| Angles ($\theta 1$, $\theta 2$) (degrees) of spoke | 20 | 20 | 20 | 20 | 20 | 20 | 20 | 20 |
| Compression rigidity ratio (Sh/Sr) of spoke | 0.90 | 0.90 | 0.70 | 0.50 | 0.90 | 0.50 | 0.30 | 0.90 |
| Length ratio (Ls/Ld) of spoke | 1.02 | 1.02 | 1.02 | 1.02 | 1.02 | 1.02 | 1.02 | 1.02 |
| Thickness ratio (Tr/Th) of spoke | 0.7 | 0.8 | 1.2 | 1.3 | 1.3 | 1 | 1 | 1 |
| Curvature radius ratio (Rh/Rr) of spoke | 0.80 | 0.80 | 0.80 | 0.89 | 1.00 | 0.50 | 0.30 | 0.80 |
| Is spoke on radial line? (*) | Y | Y | Y | Y | Y | Y | Y | N |
| Durability (index number) | 100 | 120 | 120 | 100 | 100 | 150 | 160 | 140 |
| Tire weight (index number) | 100 | 100 | 100 | 100 | 100 | 100 | 100 | 100 |
| TFV (index number) | 100 | 100 | 100 | 100 | 100 | 100 | 100 | 70 |

(*) Y: on radial line; N: not on radial line

As illustrated in Table 1, it can be confirmed that the tires of the examples allow durability to be improved while maintaining a small TFV, and allows rolling resistance to be reduced without compromising productivity.

Figure 6:
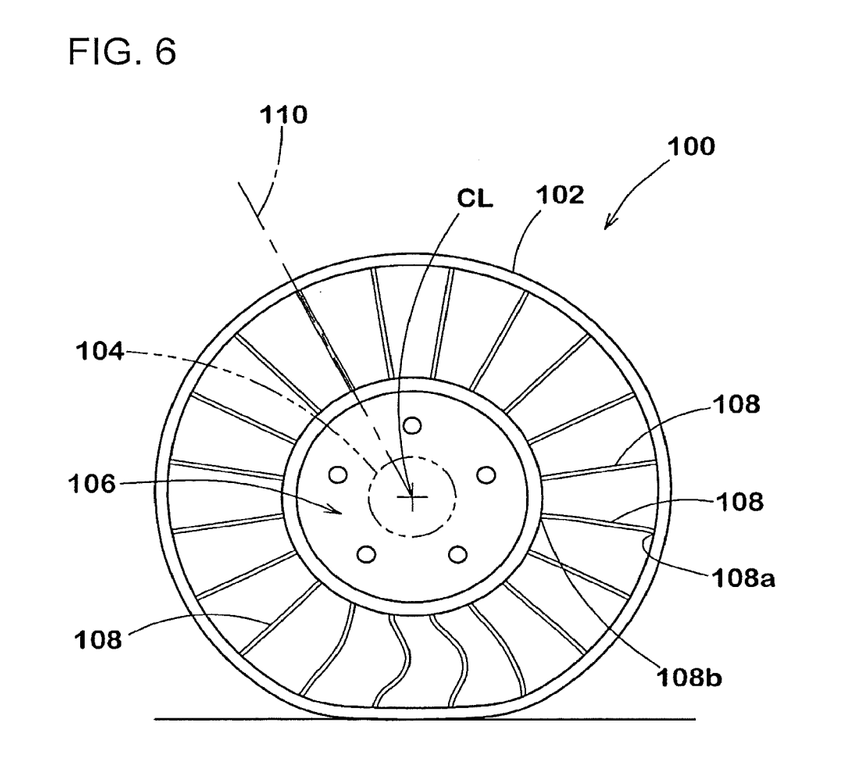
FIG. 6 is a side view of a conventional airless tire.

FIG. 6 illustrates a side view of a typical airless tire 100. The airless tire 100 includes a cylindrical tread ring 102 that is formed of an elastic body and has a ground contact surface, a metallic hub part 106 that is positioned on a radial direction inner side of the tread ring 102 and is fixed to an axle 104, and multiple spokes 108 for connecting the tread ring 102 and the hub part 106. The spokes 108, for example, are formed of a relatively soft elastomer material, and each have an outer edge (108a) that is fixed to the tread ring 102 side and an inner edge (108b) that is fixed to the hub part 106 side. In this example, in a state in which a load is not applied to the tire, the spokes 108 each linearly extend along a tire radial plane 110 (a plane that contains a tire rotation axis (CL)).

In the above-described airless tire 100, rigidity of the tread ring 102 is non-uniform in a tire circumferential direction. For example, of the tread ring 102, a portion that is connected to the outer edge (108a) of a spoke 108 has higher rigidity than a portion that is not connected to a spoke 108. In other words, in the airless tire 100 of this kind, high rigidity portions and low rigidity portions of the tread ring 102 alternately come into contact with a road surface, and thus there is a disadvantage that vibration occurs during running, resulting in poor riding comfort.

Figure 7A:
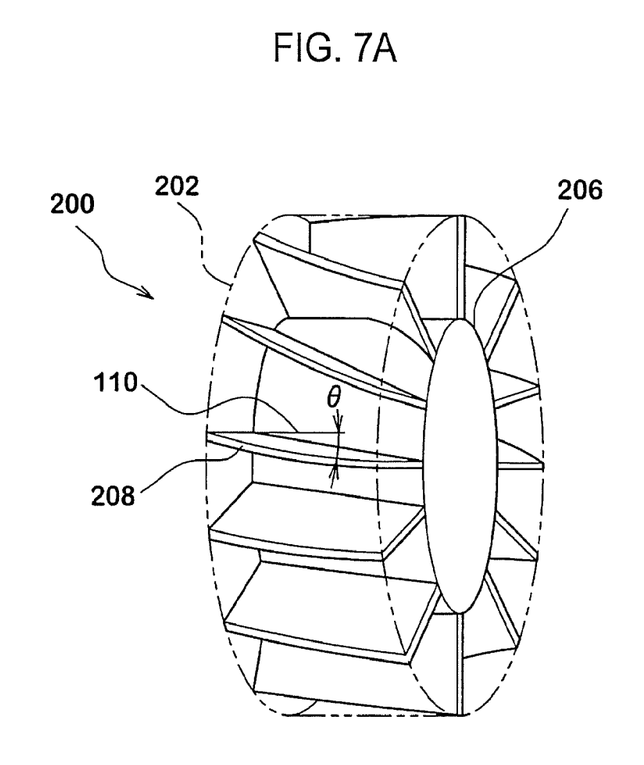
FIG. 7A is a perspective view of a conventional airless tire.
Figure 7B:
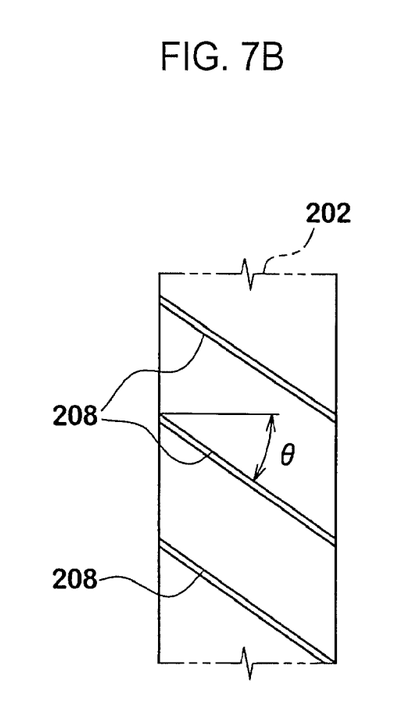
FIG. 7B is a developed view when a tread ring of the conventional airless tire is viewed from an inner peripheral surface side.

In order to overcome the above-described disadvantage, an airless tire 200 illustrated in FIGS. 7A and 7B is proposed in Japanese Patent No. 5539479. In this airless tire 200, as illustrated in FIG. 7A, spokes 208 for connecting a tread ring 202 and a hub part 206 are inclined at an angle (θ) with respect to the tire radial plane 110. As compared to the spokes that extend along the tire radial plane 110, such spokes 208 allow rapid 25 variation in rigidity of the tread ring 202 in the tire circumferential direction to be prevented, and thus an effect is expected that the above-described vibration during running is prevented and excellent riding comfort is provided.

Further, FIG. 7B is a developed view when the tread ring 202 is viewed from an inner peripheral surface side. In FIG. 7B, an up-down direction corresponds to the tire circumferential direction. As is clear from FIG. 7B, the airless tire of this example is structured such that, in the circumferential direction of the tread ring 202, the spokes 208 are always in contact with a road surface (actually, in contact with the road surface via the tread ring 202). Therefore, the airless tire 200 in this case effectively prevents the above-described vibration during running, and thus an effect is expected that excellent riding comfort is provided.

During loaded running of an airless tire, each spoke repeats extension and bending. For example, returning to FIG. 6, it can be understood that a relatively large bending force acts on a spoke 108 positioned directly above the ground contact surface of the tread ring 102, whereas a spoke positioned directly above the hub part 106 is relatively largely stretched by the hub part 106 that receives a vertical load. Therefore, for the spokes, a structure capable of withstanding mainly repeated bending and stretching is necessary.

Figure 8A:
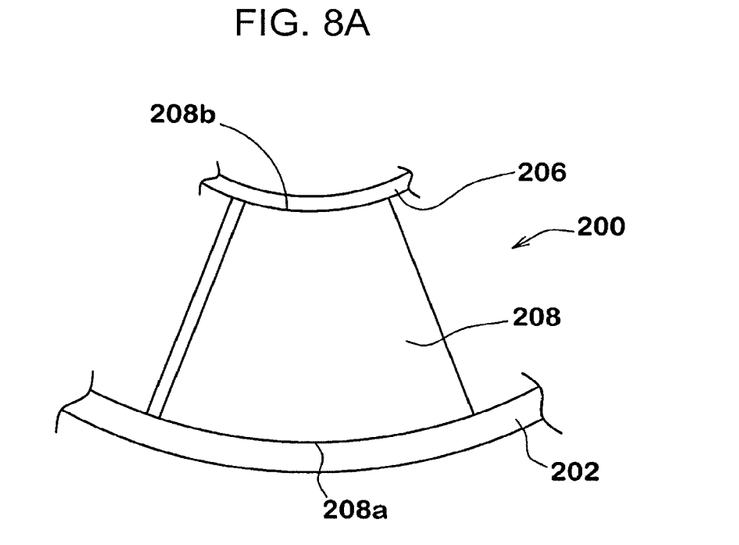
FIG. 8A is a partial side view of the airless tire of FIG. 7 in a no-load state.
Figure 8B:
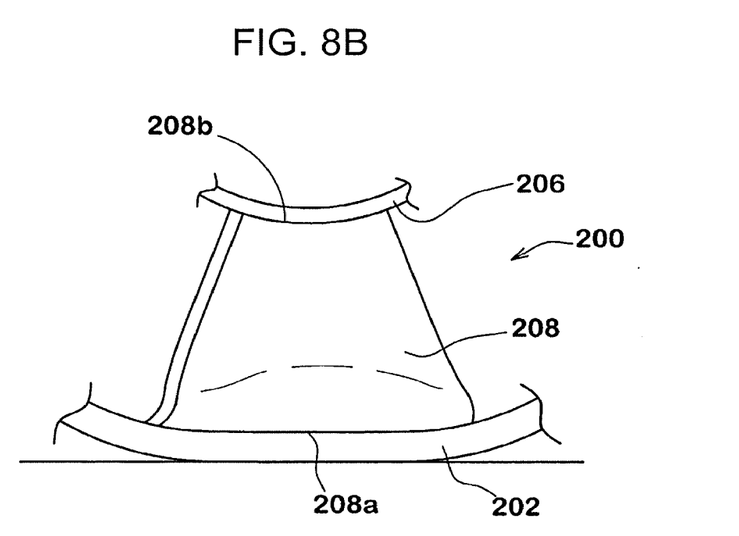
FIG. 8B is a partial side view of the airless tire of FIG. 7 in a ground-contact state.

Further, FIG. 8A illustrates a partial side view of the airless tire 200 in a no-load state, and FIG. 8B illustrates a state in which the airless tire 200 receives a vertical load and is in contact with a road surface. As illustrated in FIG. 8A, in the no-load state, an outer edge (208a) of each of the spokes 208 that are obliquely connected to the tread ring 202 has an arc shape along an arc-shaped inner peripheral surface of the tread ring 202. On the other hand, as illustrated in FIG. 8B, when the airless tire 200 receives a load and the tread ring 202 is in contact with a road surface, the outer edge (208a) of a spoke 208 at a position directly above the ground contact surface of the tread ring 202 changes to have a linear shape along the inner peripheral surface of the tread ring 202 that has become flat. In this case, bending deformation occurs in a portion of the spoke 208 on the outer edge (208a) side, and an amount of the bending deformation is the largest near a central portion in the circumferential direction and gradually decreases toward both ends.

On the other hand, the hub part 206 of the airless tire 200 is formed of a metallic material that substantially does not deform. Therefore, a portion of a spoke 208 on an inner edge (208b) side that is fixed to the hub part 206 is only bent in a direction in which a length is simply shortened.

As described above, in the airless tire having spokes that are formed to be inclined with respect to the tire radial plane in order to improve riding comfort, there is a problem that distortion is likely to concentrate on a tire radial direction outer edge side of the spokes and early damage occurs with that portion as a starting point.

An airless tire according to an embodiment of the present invention improves durability of spokes.

An airless tire according to an embodiment of the present invention include: a cylindrical tread ring that is formed of an elastic body and has a ground contact surface; a hub part that is formed of a substantially non-extensible material and that is positioned on a tire radial direction inner side of the tread ring and is fixed to an axle; and multiple spokes that are formed of an elastic material and connect the tread ring and the hub part. The spokes each has an outer edge that is fixed on the tread ring side and an inner edge that is fixed on the hub part side. The outer edge and the inner edge both extend obliquely with respect to a tire axial direction. Compression rigidity (Sr) of the outer edge side of each of the spokes is greater than compression rigidity (Sh) of the inner edge side of each of the spokes.

In another aspect of the present invention, it is desirable that a ratio (Sh/Sr) between the compression rigidities be 0.95 or less.

In another aspect of the present invention, it is desirable that a ratio (Sh/Sr) between the compression rigidities be 0.20-0.95.

In another aspect of the present invention, it is desirable that, for each of the spokes, an actual length (Ls) from the outer edge to the inner edge be 1.01-1.10 times a shortest distance (Ld) from the outer edge to the inner edge.

In another aspect of the present invention, a thickness (tr) of the outer edge side of each of the spokes can be greater than a thickness (th) of the inner edge side of each of the spokes. In this case, it is desirable that the thickness (tr) of the outer edge side of each of the spokes be 1.2 or less times the thickness (th) of the inner edge side of each of the spokes.

In another aspect of the present invention, it is desirable that, in a transverse cross section of each of the spokes along the tire radial direction, a curvature radius (Rh) of the inner edge side of each of the spokes be smaller than a curvature radius (Rr) of the outer edge side of each of the spokes.

In another aspect of the present invention, it is desirable that the outer edge and the inner edge of each of the spokes be provided on the same radial line that passes through a tire rotation axis.

In another aspect of the present invention, it is desirable that an inclination angle of the outer edge side of each of the spokes with respect to the radial line be smaller than an inclination angle of the inner edge side of each of the spokes with respect to the radial line.

In an airless tire having spokes that are obliquely inclined with respect to a tire radial plane, main deformation of the spokes when a load is applied is deformation due to an deflection amount of the tire. Further, for an outer edge side of a spoke, when in contact with a road surface, deformation is further added that the outer edge of an arc shape changes to have a shape of a straight line. On the other hand, deformation of an inner edge side of a spoke (on a hub part side) is basically only deformation due to the above-described deflection amount. Therefore, there is a tendency that distortion occurring in spokes of a conventional airless tire is greater on the outer edge side than on the inner edge side. Durability of the spokes is governed by distortion due to repeated deformation of the spokes and by heat generation due to the distortion. Therefore, in order to improve the durability of the spokes, distortion is dispersed as much as possible so that a locally large distortion does not occur in the spokes.

An airless tire according to an embodiment of the present invention is structured such that the compression rigidity (Sr) of the outer edge side of each of the spokes is greater than the compression rigidity (Sh) of the inner edge side of each of the spokes. As a result, during running of the tire, distortion occurring on the outer edge side of each of the spokes can be relatively reduced while distortion occurring on the inner edge side of each of the spokes can be relatively increased. As a result, distortion acting on each of the spokes during running of the tire is dispersed or uniformized and thus the durability of the spokes is improved.

Due to the above-described effect, an airless tire according to an embodiment of the present invention having the oblique spokes can significantly improve the durability while maintaining excellent riding comfort.

Obviously, numerous modifications and variations of the present invention are possible in light of the above teachings. It is therefore to be understood that within the scope of the appended claims, the invention may be practiced otherwise than as specifically described herein.

What is claimed is:

1. An airless tire, comprising:
   a tread ring comprising an elastic body and having a cylindrical form and a ground contact surface;
   a hub comprising a substantially non-extensible material and positioned on a tire radial direction inner side of the tread ring such that the hub is configured to be fixed to an axle; and
   a plurality of spokes comprising an elastic material and connecting the tread ring and the hub,
   wherein each of the spokes has an outer edge fixed to the tread ring and an inner edge fixed to the hub such that the outer edge and the inner edge are extending obliquely with respect to a tire axial direction, and the plurality of spokes is formed such that the outer edge of each of the spokes has compression rigidity Sr which is greater than compression rigidity Sh of the inner edge of each of the spokes and that each of the spokes has an actual length Ls which is from the outer edge to the inner edge in a range of from 1.01 to 1.10 times a shortest distance Ld from the outer edge to the inner edge.

2. The airless tire according to claim 1, wherein the plurality of spokes is formed such that a ratio Sh/Sr between the compression rigidity Sh and the compression rigidity Sr is 0.95 or less.

3. The airless tire according to claim 2, wherein the plurality of spokes is formed such that each of the spokes has a thickness tr at the outer edge which is greater than a thickness th at the inner edge.

4. The airless tire according to claim 3, wherein the plurality of spokes is formed such that each of the spokes has the thickness tr at the outer edge which is 1.2 times or less than the thickness th at the inner edge.

5. The airless tire according to claim 2, wherein the plurality of spokes is formed such that each of the spokes has a curvature radius Rh at the inner edge which is smaller than a curvature radius Rr at the outer edge in a transverse cross section of each of the spokes along the tire radial direction.

6. The airless tire according to claim 2, wherein the plurality of spokes is formed such that each of the spokes has the outer edge and the inner edge on a same radial line passing through a tire rotation axis.

7. The airless tire according to claim 6, wherein the plurality of spokes is formed such that each of the spokes has an inclination angle at the outer edge with respect to the radial line which is smaller than an inclination angle at the inner edge with respect to the radial line.

8. The airless tire according to claim 1, wherein the plurality of spokes is formed such that a ratio Sh/Sr between the compression rigidity Sh and the compression rigidity Sr is in a range of 0.20 or greater and 0.95 or less.

9. The airless tire according to claim 8, wherein the plurality of spokes is formed such that each of the spokes has a thickness tr at the outer edge which is greater than a thickness th at the inner edge.

10. The airless tire according to claim 9, wherein the plurality of spokes is formed such that each of the spokes has the thickness tr at the outer edge which is 1.2 times or less than the thickness th at the inner edge.

11. The airless tire according to claim 8, wherein the plurality of spokes is formed such that each of the spokes has a curvature radius Rh at the inner edge which is smaller than a curvature radius Rr at the outer edge in a transverse cross section of each of the spokes along the tire radial direction.

12. The airless tire according to claim 8, wherein the plurality of spokes is formed such that each of the spokes has the outer edge and the inner edge on a same radial line passing through a tire rotation axis.

13. The airless tire according to claim 12, wherein the plurality of spokes is formed such that each of the spokes has an inclination angle at the outer edge with respect to the radial line which is smaller than an inclination angle at the inner edge with respect to the radial line.

14. The airless tire according to claim 1, wherein the plurality of spokes is formed such that each of the spokes has a thickness tr at the outer edge which is greater than a thickness th at the inner edge.

15. The airless tire according to claim 14, wherein the plurality of spokes is formed such that each of the spokes has the thickness tr at the outer edge which is 1.2 times or less than the thickness th at the inner edge.

16. The airless tire according to claim 1, wherein the plurality of spokes is formed such that each of the spokes has a curvature radius Rh at the inner edge which is smaller than a curvature radius Rh at the outer edge in a transverse cross section of each of the spokes along the tire radial direction.

17. The airless tire according to claim 1, wherein the plurality of spokes is formed such that each of the spokes has the outer edge and the inner edge on a same radial line passing through a tire rotation axis.

18. The airless tire according to claim 17, wherein the plurality of spokes is formed such that each of the spokes has an inclination angle at the outer edge with respect to the radial line which is smaller than an inclination angle at the inner edge with respect to the radial line.

19. An airless tire, comprising:
   a tread ring comprising an elastic body and having a cylindrical form and a ground contact surface;
   a hub comprising a substantially non-extensible material and positioned on a tire radial direction inner side of the tread ring such that the hub is configured to be fixed to an axle; and
   a plurality of spokes comprising an elastic material and connecting the tread ring and the hub,
   wherein each of the spokes has an outer edge fixed to the tread ring and an inner edge fixed to the hub such that the outer edge and the inner edge are extending obliquely with respect to a tire axial direction, and the plurality of spokes is formed such that the outer edge of each of the spokes has compression rigidity Sr which is greater than compression rigidity Sh of the inner edge of each of the spokes and that each of the spokes has a curvature radius Rh at the inner edge which is smaller than a curvature radius Rr at the outer edge in a transverse cross section of each of the spokes along the tire radial direction.

20. An airless tire, comprising:
a tread ring comprising an elastic body and having a cylindrical form and a ground contact surface;
a hub comprising a substantially non-extensible material and positioned on a tire radial direction inner side of the tread ring such that the hub is configured to be fixed to an axle; and
a plurality of spokes comprising an elastic material and connecting the tread ring and the hub,
wherein each of the spokes has an outer edge fixed to the tread ring and an inner edge fixed to the hub such that the outer edge and the inner edge are extending obliquely with respect to a tire axial direction, and the plurality of spokes is formed such that the outer edge of each of the spokes has compression rigidity Sr which is greater than compression rigidity Sh of the inner edge of each of the spokes and that each of the spokes has the outer edge and the inner edge on a same radial line passing through a tire rotation axis and that each of the spokes has an inclination angle at the outer edge with respect to the radial line which is smaller than an inclination angle at the inner edge with respect to the radial line.

* * * * *